W. L. ROBBINS.
MUSIC CHART.
APPLICATION FILED MAY 12, 1915.
1,286,785.
Patented Dec. 3, 1918.
3 SHEETS—SHEET 1.
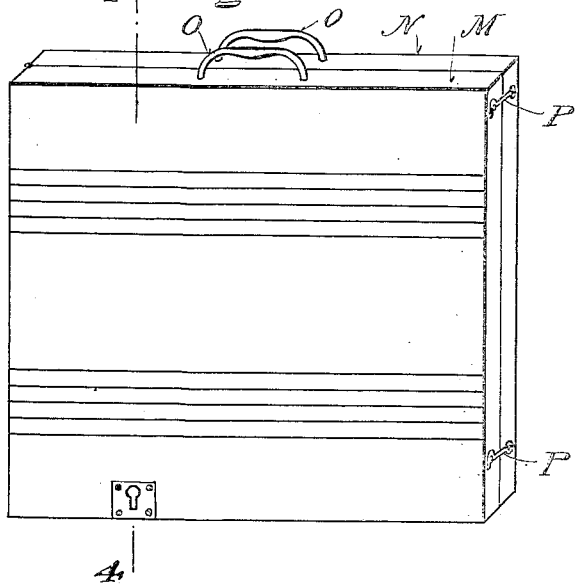
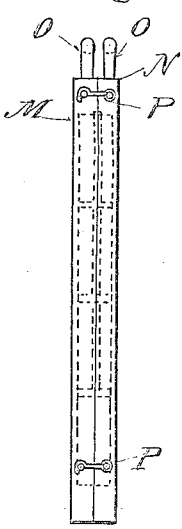
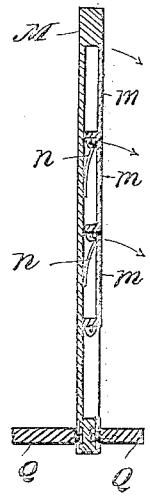
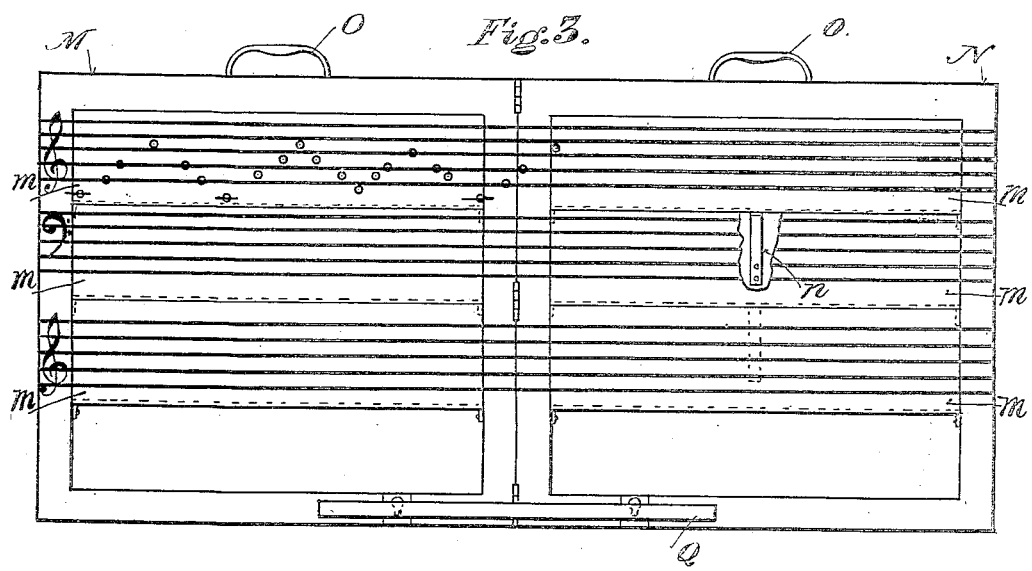
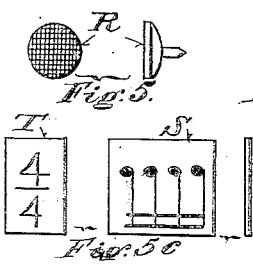
WITNESSES:
M. H. Plaisted.
W. M. Kendall
INVENTOR.
Wilburn L. Robbins.
BY
H. M. Plaisted.
ATTORNEY.

W. L. ROBBINS.
MUSIC CHART.
APPLICATION FILED MAY 12, 1915.
1,286,785.
Patented Dec. 3, 1918.
3 SHEETS—SHEET 2.
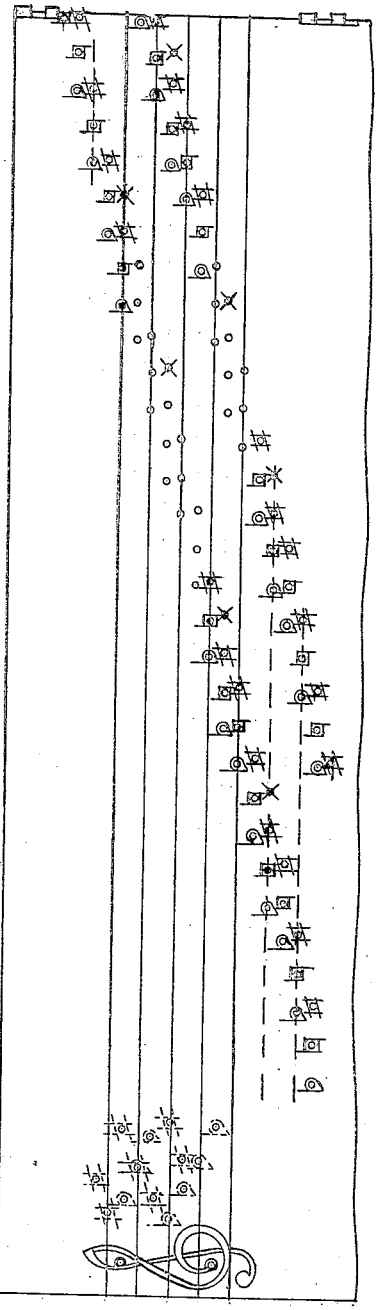
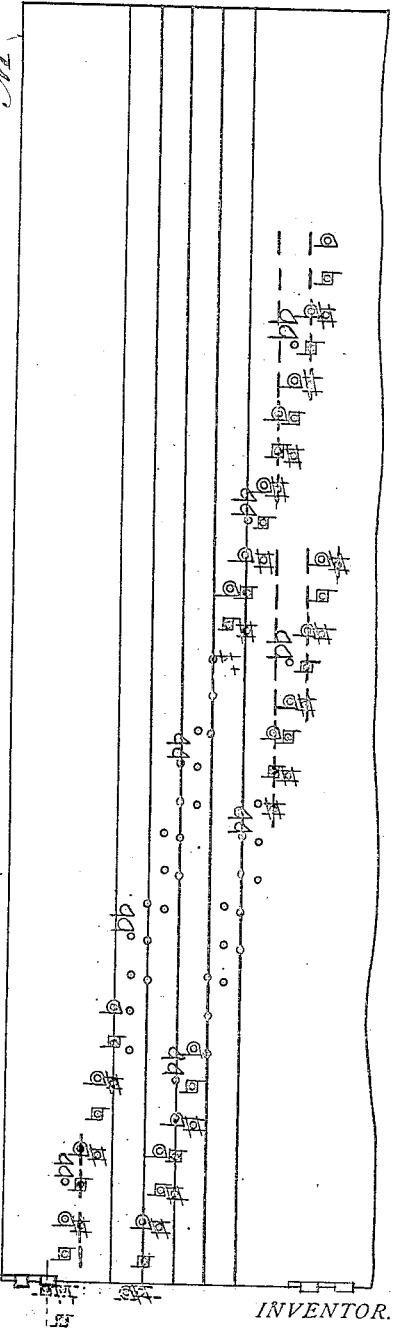
WITNESSES:
INVENTOR.
BY
ATTORNEY.

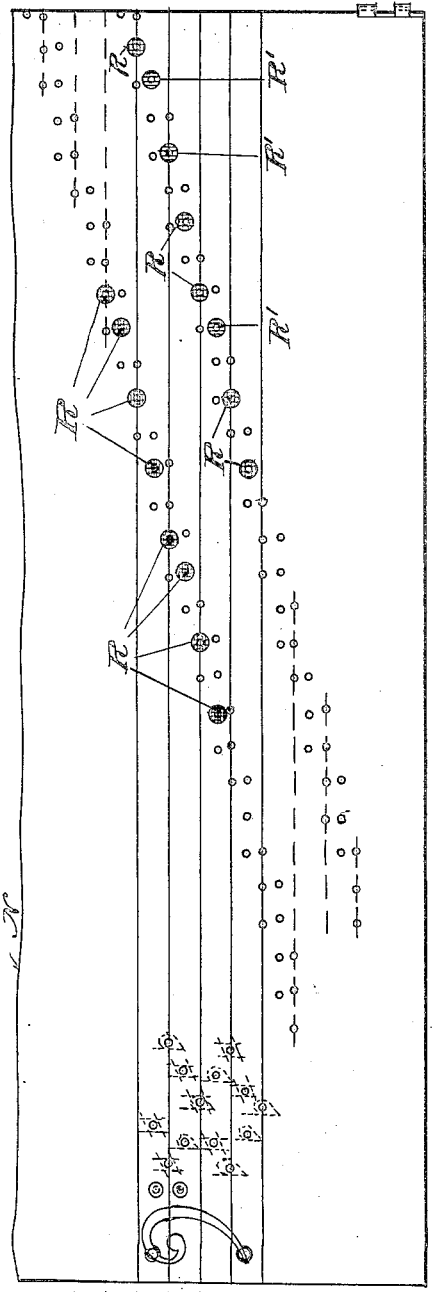
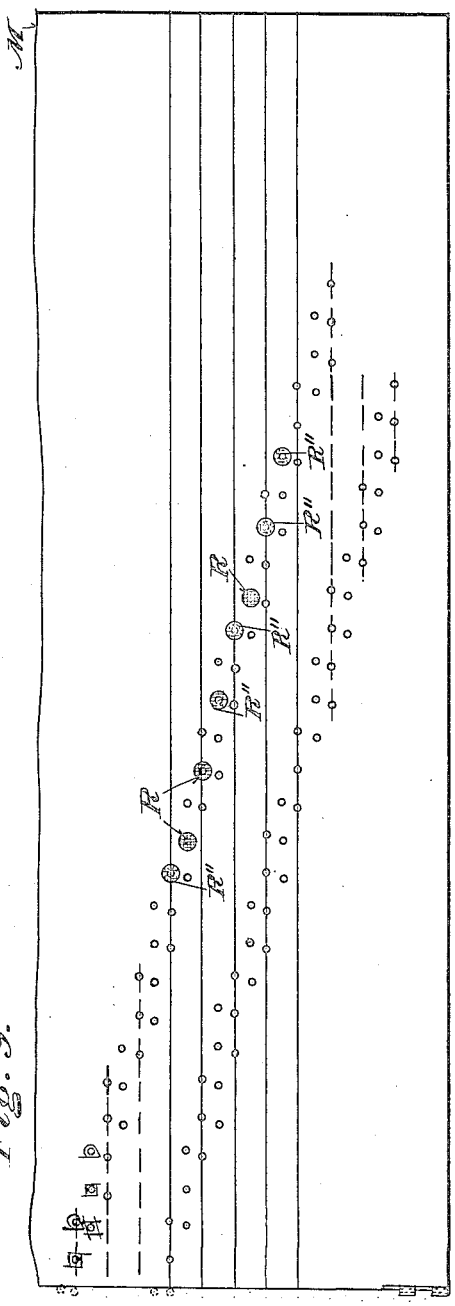

UNITED STATES PATENT OFFICE.

WILBURN L. ROBBINS, OF GRANITE CITY, ILLINOIS.

MUSIC-CHART.

1,286,785.  Specification of Letters Patent.  Patented Dec. 3, 1918.

Application filed May 12, 1915. Serial No. 27,541.

*To all whom it may concern:*

Be it known that I, WILBURN L. ROBBINS, a citizen of the United States, residing at Granite City, in the county of Madison and State of Illinois, have invented certain new and useful Improvements in Music-Charts, of which the following is a specification.

This invention relates to certain new and useful improvements in music charts, and its object is to facilitate teaching scales, intervals, and time values. The peculiarities of my invention will be hereinafter described and particularly pointed out in the claims.

In the accompanying drawings on which like reference letters indicate corresponding parts, Figure 1 represents a folded chart case embodying my invention;

Fig. 2, an edge view of the same;

Fig. 3, an inside elevation of the case opened;

Fig. 4, a vertical section of one leaf on line 4—4 of Fig. 1 with the shelf Q added on each side;

Fig. 5, a face and side view of a disk-pin with a black top designating notes which are natural;

Figs. 5ª and 5ᵇ, top views of red and yellow pins designating notes which are sharp or flat respectively; 5ᶜ, cards having notes or characters representing time values only;

Fig. 6, an enlarged view of the upper part of one leaf of the case shown in Fig. 3 showing the treble clef with rows of holes in ascending scale according to my system;

Fig. 7, an enlarged view of part of the other leaf shown in Fig. 3 and illustrating the descending scale according to my system;

Fig. 8, a similar view of part of a staff shown in Fig. 3 having the bass clef with ascending scale according to my system;

Fig. 9, a similar view of part of a staff shown in Fig. 3 having the bass clef with descending scale shown thereon according to my system;

Fig. 10, a detail of the viola or c clef;

Fig. 11, a top view of a disk-pin showing a flat; and

Figs. 11ª to 11ᶠ inclusive, similar views showing double-flat, natural sharp, sharp, natural, double-sharp, and natural-flat respectively. These characters are used to represent accidentals.

The letters M and N designate two halves of leaves of a flat case, preferably hinged at one side or vertical edge, so as to allow opening it out to present a chart surface on which are ruled lines representing the usual music staff with treble and bass clefs, preferably on the outside of the case. A pair of handles are provided at the top of the case for convenience in handling, and a catch such as a hook and eye P, at the upper and lower corners opposite the hinges, holds the leaves together. A shelf Q of such size as to fit inside the closed case, when not in use, has two fastening means of any suitable style by which the shelf is fastened across the joint like a brace. The open chart may be hung by the handles or otherwise supported. These leaves are preferably formed of rectangular frames, covered on the outside with thin boards of wood or other material, so as to form a recess on the inner side of leaves in which may be stored pins, blocks, or other supplies. The outside thus presents a flat surface. On this flat surface, which is the outside of above described leaves, are painted, or otherwise applied, music staves of such size as desired. The clefs of treble and bass (G clef and F clef respectively) are applied to the staves, which are shown in Figs. 6,—7,—8,—9, on a larger scale, and on these staves a series of holes or other indicating means, are arranged in definite order and in limited number, to form ascending and descending scales on each staff. Thus each space and line of the staff has at least three holes arranged in a horizontal row. In these holes can be placed characters or notes representing the flat, the natural, and the sharp, at that place. In the ascending scale at the letters F and C an additional hole is used to show the double sharp, and in the descending scale an additional hole is used at B and E to show the double flat. The middle hole of three is used to indicate the natural at that place, the hole on the left ascending, and the hole on the right descending is used to indicate the flat; and the hole on the right ascending, but on the left descending is used to indicate the sharp. Where four holes are used, the right hand hole in descending is the double flat; and the right hand hole is the double sharp in the ascending scale. For the highest notes duplicate holes are found necessary. Five holes are supplied at the highest degree represented on the chart, for in the ascending scale the sharps are represented to the right of the line of holes at each degree of the staff, and the flats to the left; but in the descending scale the order must be reversed and hence the five holes: the middle hole is for the sharp, the first one to the right of the middle hole is for the natural, and the second one to the right for the flat. Also the first one to the left is for the natural and the second one to the left is for the flat. The system of arranging the holes or other indicating means on this chart is as follows:

The interval of one half tone in pitch is represented on the staff by a pre-determined distance (according to the size of the chart) and this distance I call a unit distance. The interval of one tone in pitch is represented by two unit distances. Therefore, any interval of pitch is represented by a corresponding number of unit distances, equal to the number of half tones it contains. For example, all the intervals between tones in the major scale of C natural are represented two unit distances apart, except from E to F and B to C which are one unit distance apart.

In any major scale in any key, the half tones are shown between the third and fourth, and seventh and eighth degrees, by one unit distance on the chart; while the interval of a tone is shown by two unit distances. In like manner any scale, major, minor (any form), chromatic, or any possible scale using tones and half tones, either ancient or modern, can be shown with the same relation between difference of pitch and distance on the chart; and by the use of colored disks and other disks mentioned, it can be shown whether the notes are affected by the key signature, or by accidentals, or remain natural.

In chromatic scales, the unit distance is identical, whether a chromatic or diatonic half step is shown. Enharmonic tones are represented practically one directly over the other.

This definite arrangement of holes, thus indicating the letter names corresponding to their staff location, and also the difference of pitch by the relative distance on the chart between any two holes, provides a ready means to designate correctly the interval, between two notes, by the definite unit distance, or multiple thereof, corresponding to the said interval; and the provision of a limited number of holes, together with the precise location of each note according to said unit measure, confines the attention of the pupil, and directs him in his search on the chart, for the interval requested by the teacher, when the pupil is placing the notes; and in naming the interval, when the notes have been already placed.

This system of properly placed holes will indicate the proper notes on the chart, the distance between which notes indicates or corresponds with a required interval, whatever the starting point or the key may be.

I have shown on a staff using the treble clef, Figs. 6 and 7, a lower scale both ascending and descending. These two scales are laid off on the same staff according to my system, so that two instruments having different pitch or compass, as B-flat cornet or E-flat alto, may play together in unison or in octaves; for instruments like E-flat bass or trombone, the bass clef is used.

Referring now to Figs. 8 and 9, showing the bass clef,—the same system of indicating holes is carried out in the two scales; and in addition I have also shown thereon several designating characters, such as disk-pins R, Fig. 5, having rounded bottoms and pegs to fit said holes in this system. The rounded bottom facilitates taking them off the chart; Fig. 5 shows the face and edge of a black disk for designating naturals, while 5ª and 5ᵇ show red and yellow disks for designating respectively sharps and flats. Thus, the black disk-pins only are required to designate the key of C major as shown in the upper scale (see Fig. 8). In the lower scale I illustrate the key of A. Starting from the first space, the black pins R designate the naturals: A, B, D, E, and upper A, while the red pins R designate the three sharps: F-sharp, C-sharp and G-sharp,—required by this key. Fig. 9, (key of A-flat) shows the use of yellow disk-pins R for B-flat, E-flat, A-flat, and D-flat, in the holes provided for them; while the rest of the scale is shown by black pins R. Thus I employ colors to designate notes that are raised or lowered in pitch by the key signature. While I have shown in Figs. 6 and 7 the proper characters that are used in this system of holes, these characters are shown for explanation only and are not permanently attached to the chart. Besides the colored disk-pins mentioned, other disk-pins are provided, having designating characters such as flat, double-flat, natural-sharp, sharp, natural, double-sharp, and natural-flat, respectively shown in Figs. 11ª to Fig. 11ᶠ for use where required.

While the term "holes" has been used in describing this system, it is understood it covers any other means that are equivalent, for indicating points or notes on the music staff according to my system.

As a means of teaching time values aside from pitch, I have provided a series of cards or blocks of notes and combinations of notes,—such as suggested by time-card T, Fig. 5ᶜ, note-card S and bar U. These are stored on the inside of the chart case when they are not in use, but are set up on the shelf Q or in the recess of the frame, when it is required to illustrate and teach time values. Thus I would place a card having four sixteenth notes as card S shown, beside a card having one quarter note, and another card having a half note, in order thus to represent a measure in $\frac{4}{4}$ time.

Having thus described my invention, what I claim, and desire to secure by Letters Patent of the United States, is:—

1. A music chart comprising a staff on each degree of which are three holes so located with regard to adjacent holes and each other as to designate the flat, the natural and the sharp at the respective degree, and a fourth hole on the right at the degrees F and C in the ascending scale thereby respectively designating the double sharp at these degrees, and in the descending scale a fourth hole on the right at B and E respectively designating the double flat at the degrees last named,—the distance between two adjacent holes on the same degree being a definite unit distance representing a half tone interval, and the distance from one hole at any degree to the adjacent hole at the next degree above, measured obliquely in the general direction of the ascending scale, being the same predetermined unit distance representing a half tone interval, as when measured horizontally.

2. A music chart comprising staves provided with holes situated a predetermined distance apart on each degree,—said distance corresponding to a half-tone interval,— and a plurality of different colored disks having flat tops and rounded bottoms and provided with pegs to fit said holes,—said disks showing by their color whether the note represented is flat, sharp, or natural, and by their distance apart the corresponding interval,—said predetermined distance or multiple thereof being the same whether measured horizontally or obliquely between holes representing a half tone interval or a multiple of half tone interval.

3. A music chart comprising two staves,— one for the G-clef and one for the F-clef, having holes separated by a predetermined unit distance or multiple thereof,—said distance between adjacent holes on the same degree measured horizontally and representing half tone intervals, being the same as when measured obliquely as a diatonic half step.

4. A music chart comprising two staves with holes for indicating the flat, sharp, and natural of each letter within the compass of the chart, and with an additional hole at F and C respectively for indicating the double sharp, and an additional hole at B and E respectively for indicating the double flat,— said holes being separated by a predetermined unit distance representing a half tone interval; said groups of holes forming one complete system of holes running in the general direction of ascending and descending scales respectively, thus making all the holes the distance between two of which represents a half tone, equally distant one from the other,—whether measured obliquely to the staff as a diatonic half tone or measured horizontally as a chromatic half tone.

In testimony whereof I have affixed my signature in presence of two witnesses.

WILBURN L. ROBBINS.

Witnesses:
  H. M. PLAISTED,
  W. M. RENDALL.